US006373593B1

(12) United States Patent
Yamada et al.

(10) Patent No.: US 6,373,593 B1
(45) **Date of Patent: *Apr. 16, 2002**

(54) PRINTER WHICH ACCOMMODATES CARRIAGE SPEED NON-UNIFORMITIES

(75) Inventors: Akitoshi Yamada; Hiromitsu Hirabayashi; Akihiko Sukigara, all of Irvine, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,110

(22) Filed: May 4, 1998

(51) Int. Cl.[7] ........................ G06F 15/00

(52) U.S. Cl. ........................ 358/1.5; 347/37; 347/41; 400/10

(58) Field of Search ........................ 358/1.1, 1.5, 1.12, 358/1.13, 1.14; 347/35, 40, 41, 42, 43, 37, 57, 103, 105; 400/61, 76, 82, 10

(56) References Cited

U.S. PATENT DOCUMENTS 3,764,994 A 10/1973 Brooks et al. ........... 340/172.5
5,527,121 A * 6/1996 Santon ........................ 400/323
5,997,130 A * 12/1999 Bolash et al. ................ 358/1.5
6,050,674 A * 4/2000 Hirabayashi et al. ......... 347/40

FOREIGN PATENT DOCUMENTS

| | | |
|---|---|---|
| EP | 284796 | 10/1988 |
| EP | 0284796 A2 * | 10/1988 |
| EP | 465850 | 1/1992 |
| EP | 724962 | 8/1996 |

* cited by examiner

*Primary Examiner*—Mark Wallerson
(74) *Attorney, Agent, or Firm*—Fitzpatrick, Cella, Harper & Scinto

(57) ABSTRACT

Printing which accommodates carriage speed non-uniformities by allowing both forward and reverse printing despite the presence of ringing and other overshoot anomalies in carriage printing speed. A determination is made as to whether print data for a current scan and a prior scan overlap in either of two critical zones at lateral extents of the recording medium, where carriage speed ringing and overshoot non-uniformities are most prevalent. If print data for a current scan and a prior scan overlap in either of the two critical zones, the current scan is printed in the same direction as that of the prior scan. On the other hand, if print data for the current scan and the prior scan do not overlap in either of the two critical zones, then printing of the current scan is effected in a direction opposite to that of the prior scan.

27 Claims, 8 Drawing Sheets

PRINTER WHICH ACCOMMODATES CARRIAGE SPEED NON-UNIFORMITIES

BACKGROUND OF THE INVENTION

1. Field of the Invention

The present invention relates to a printer which prints using a print head mounted on a movable carriage, such as an ink jet printer, which prints through uni-directional or reciprocal back and forth motions of its print head carriage. More particularly, the invention relates to such a printer in which carriage speed non-uniformities are accommodated by determining print direction and print speed based on printed data content, paper size and the like.

2. Description of the Related Art

Printers such as ink jet printers have become an extremely popular format for achieving high quality computer print out at low cost. These printers form a printed image through movement of a movable carriage, on which a print head is mounted, in reciprocal uni-directional or left and right printing passes at high scanning speeds across the width of a recording medium, while the recording medium is slowly fed in the lengthwise direction. In the case of ink jet printers, the printed image is formed by ejecting small ink droplets from the print head in predetermined patterns on to the recording medium.

One impediment to the formation of high quality images is non-uniformities in carriage speed. A particularly trouble-some source of carriage speed non-uniformities is overshoot and ringing in carriage speed which occurs as the carriage is ramped up from a standstill position to a target scanning speed. This situation is illustrated in FIG. 1, in connection with a printer having two print heads, labeled "A" and "B", mounted on a single moveable carriage 11. FIG. 1 is a graphical representation of carriage speed 12 as the carriage commences movement from a standstill position at 14 to a target scanning speed 15 across the width of a recording medium. As seen in FIG. 1, during ramp up from a standstill position to a target scanning speed, speed in carriage 11 exhibits ringing and overshoot indicated generally at 16.

Assuming that print head A commences print out at the position indicated by "a", it will be seen that print quality from print head A will be affected by carriage speed non-uniformities to the extent indicated at ΔA. On the other hand, print head B will not reach position "a" until the carriage has continued movement to the position indicated in phantom lines. At that position, ringing, overshoot and other carriage non-uniformities have decreased greatly. Accordingly, print quality from print head B will be affected by carriage speed non-uniformities only to the extent of that indicated at ΔB. Since ΔA and ΔB are different, it will be appreciated that print quality will be affected differently for print head A and print head B. Thus, in a case where print out by print head A is desired to be superimposed over print out by print head B, accuracy of the superimposition will be degraded, since at the same print position, print head A will be printing at a slightly different speed than print head B.

Some conventional devices have avoided this effect on print quality by printing with the outermost print head in forward and reverse directions, that is printing only with print head B in a forward direction and printing only with print head A in a reverse direction. With this arrangement, the carriage will have reached a stable enough constant speed in each direction by the time that print out from each head is effected. On the other hand, this arrangement slows overall printing efficiency, since it is not possible to print with both heads in each of the forward and reverse directions.

Another problem caused by carriage speed non-uniformities is illustrated in FIG. 2, and involves coordination of forward and reverse printing. Shown in FIG. 2 is a recording medium 20 on which it is desired print a first band of print data in area 21 in a forward direction, followed by a second band of print data in a reverse direction in band 22. 24 indicates overshoot and ringing in carriage speed in the forward direction of printing, while 25 indicates carriage speed overshoot and ringing while printing in the reverse direction. As can be seen in FIG. 2, carriage speed matches only in the central region 26 in each of bands 21 and 22. At the left most position 27, while carriage speed in reverse printing is constant, significant overshoot and ringing is still exhibited for printing in the forward direction; likewise, at extreme right position 28, although carriage speed in the forward direction is constant, significant ringing and overshoot is still exhibited in carriage speed in the reverse direction. Accordingly, print out at the extreme right and extreme left positions does not match in vertically adjacent bands, resulting in degraded print quality.

SUMMARY OF THE INVENTION

It is an object of the invention to address carriage speed non-uniformities, by providing for a judgment of printing direction and/or printing speed based on content of print data, recording medium width, and the like.

In one aspect, after commencing print out in one direction, a determination is made prior to each subsequent scan as to whether or not the lateral extent of the printed data is great enough so as to cause degradations in print quality, due to non-uniformities in carriage speed, if the subsequent scan were printed in a reverse direction. For example, if a first scan were printed in a forward direction, and included print data which extended across the entire width of the recording medium, and a subsequent scan includes print data that also extends across the entire width of the recording medium, than a determination would be made that print quality would be adversely affected by printing the subsequent scan in the reverse direction. Accordingly, the subsequent scan is printed in the same forward direction as the first scan. On the other hand, if the subsequent scan included print data only in a central area of the recording medium, then print quality would not be adversely affected by non-uniformities in carriage speed. Accordingly, reverse printing of the subsequent scan would be effected. Thereafter, printing for a next subsequent scan could be effected in either of the forward or reverse directions, regardless of the content of the print data, since the now-previous scan occupies only a central area of the recording medium indicating that carriage non-uniformities would not adversely affect print quality of the next subsequent scan.

Likewise, if print out were being effected on a narrow-width recording medium, occupying only a central area of carriage scanning, then printing could be effected in either a forward or reverse direction without adversely affecting print quality due to carriage speed non-uniformities.

In further aspects, the invention slows the overall carriage printing speed for individual ones of printing scans, so as to lower the adverse effect of carriage speed non-uniformities. Specifically, at slowed carriage scanning speeds, the size of ringing and overshoot non-uniformities are reduced significantly. Accordingly, even though one or two printing scans on a recording medium might have been performed slowly, overall printing efficiency is increased since other scans can be printed in forward and reverse directions, without adversely affecting print quality due to carriage speed non-uniformities. Accordingly, overall printing efficiency is increased.

This brief summary has been provided so that the nature of the invention may be understood quickly. A more complete understanding of the invention can be obtained by reference to the following detailed description of preferred embodiments thereof in connection with the attached drawings.

DETAILED DESCRIPTION OF THE PREFERRED EMBODIMENTS

Figure 3:
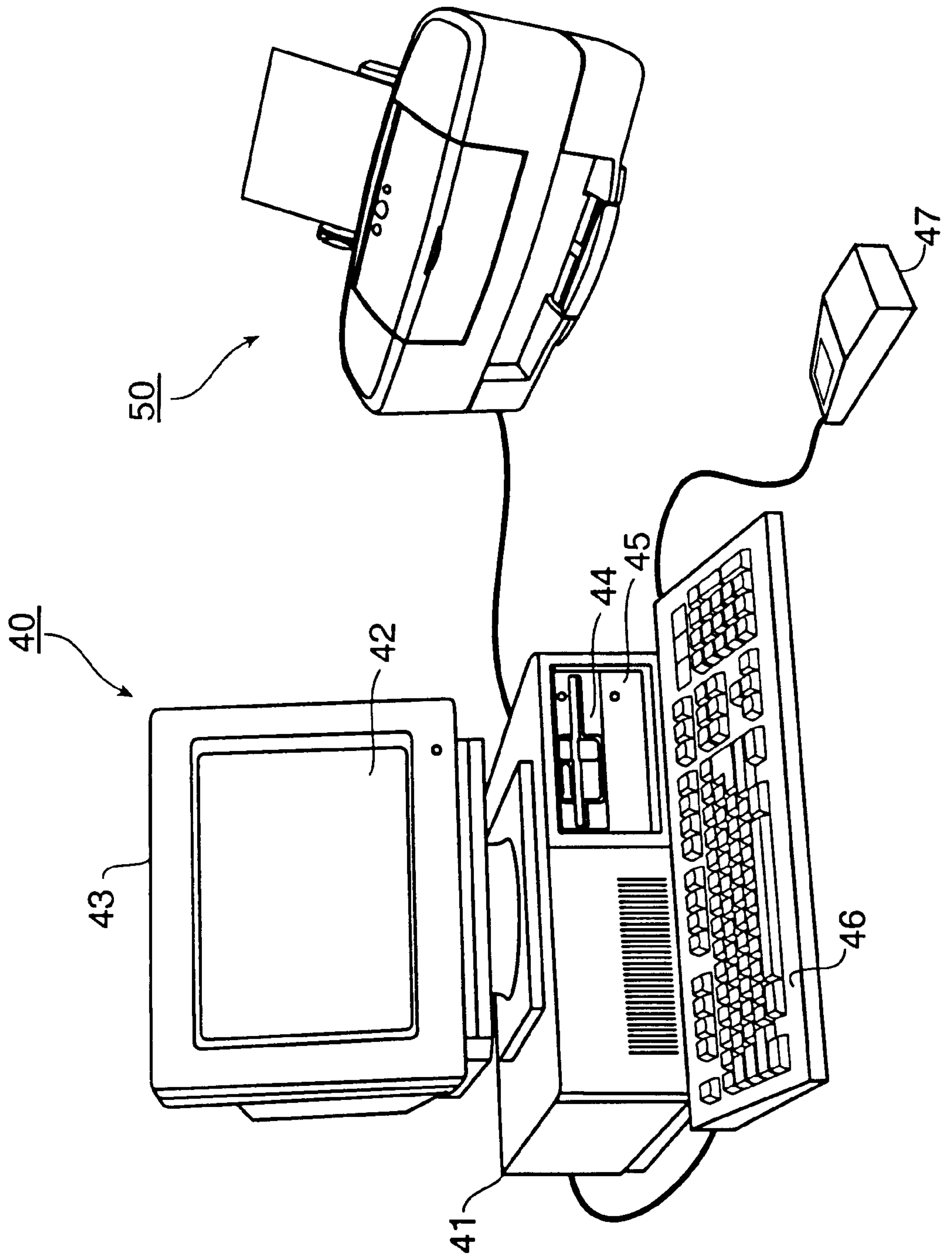
FIG. 3 is a perspective view of computing equipment and a printer used in connection with the present invention.

FIG. 3 is a view showing the outward appearance of computing equipment 80 and a printer 50 used in connection with the practice of the present invention. Computing equipment 40 includes host processor 41 which comprises a personal computer (hereinafter "PC"), preferably an IBM PC-compatible computer having a windowing environment such as Microsoft Windows 95. Provided with computing equipment 40 are display 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium such as computer disk 45 and/or floppy disk drive 44. Floppy disk drive 44 provides a means whereby computing equipment 40 can access information, such as data, application programs, etc. stored on removable memory media. A similar CD-ROM interface (not shown) may be provided for computing equipment 40 through which computing equipment 40 can access information stored on removable CD-ROM media.

Printer 50 is preferably a color ink jet printer which forms images by ejecting droplets of ink onto a recording medium such as paper or transparencies or the like. One suitable printer is described in application Ser. No. 08/972,139, "Ejection Tray For A Printer", the contents of which are incorporated herein by reference as if set forth in full. The invention is usable with other printers, however, so long as the printer prints using a print head mounted on a movable carriage.

Figure 4:
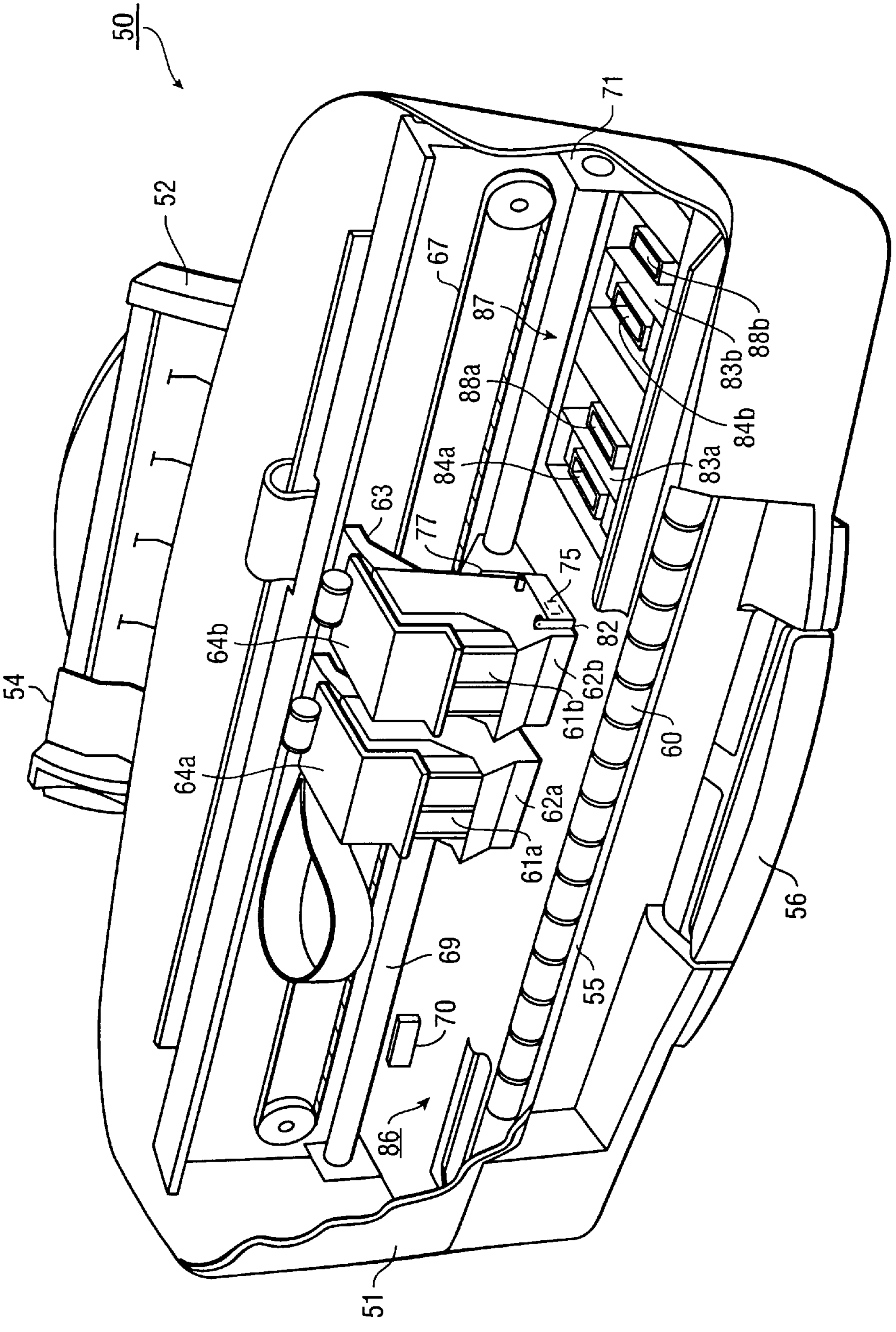
FIG. 4 is cut-away front perspective view of the printer of FIG. 3 showing multiple print heads.

FIG. 4 is a cut-away front perspective view of printer 50. As shown in FIG. 4, printer 50 includes housing 51 covered by an unshown removable cover, supply tray 52 for an automatic sheet feeder, feed width adjuster 54, ejection port 55, and slidably stowable ejection tray 56. An unshown manual feed slot accepts wide-format or thick recording media. Not shown in FIG. 4 are indicator lights, power buttons, resume (on/offline) buttons, power supply and cord, and a parallel port connector for connection of printer 50 to computing equipment 40, preferably via a bi-directional communication interface.

As further shown in FIG. 4, printer 50 includes rollers 60 for feeding media from either the automatic feeder or the manual feeder through printer 50 to media ejection port 55. Removable dual print heads 61*a* and 61*b* are mounted in respective receiving stations 62*a* and 62*b* which in turn are mounted at a fixed horizontal offset on carriage 63. Covers 64*a* and 64*b* latch print heads 61*a* and 61*b* in position at receiving stations 62*a* and 62*b*. Carriage 63 is mounted for reciprocal left and right scanning movements on carriage guide rod 69, and carriage 63 is reciprocally driven across guide rod 69 by belt 67 and an unshown carriage drive motor. Carriage 63 can be driven from an extreme leftward position indicated generally at 86, which is outside of a carriage reciprocation area during normal (standard or wide width) print operations, to an extreme rightward position indicated generally at 87, which is also outside of carriage reciprocation operation area during normal printing. Position 87 is also referred to as a "home" position, and includes a pair of ink ejection stations 84*a* and 84*b*, a pair of wiping blades 83*a* and 83*b* for wiping the face of the print heads to remove ink residue, and a pair of ink capping stations 88*a* and 88*b*, each for respective ones of print heads 61*a* and 61*b*.

Hingedly mounted on carriage 63 is alignment sensor cover 75 which, during normal print operation, covers alignment sensor 82 (shown in phantom lines) which is used to align print head 61*a* to print head 61*b*. Movement of carriage 63 between the extreme left position 86 (for engagement with upstanding tab 70) and extreme right position 87 cause cover 75 to be hinged open and closed.

Figure 5:
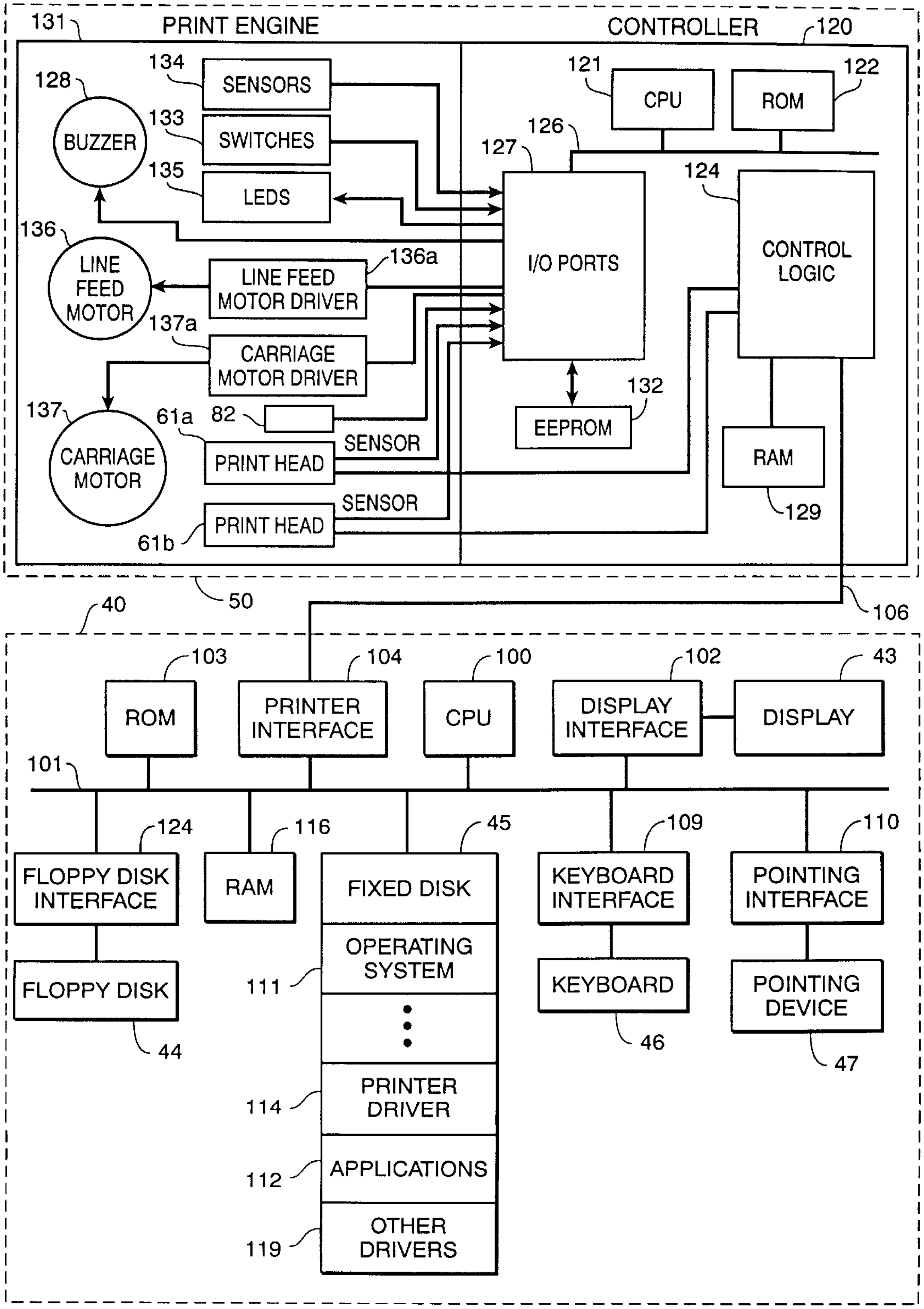
FIG. 5 is a detailed block diagram showing the hardware configuration of computing equipment interfaced to the printer of FIG. 3.

FIG. 5 is a block diagram showing the internal structures of computing equipment 40 and printer 50. In FIG. 5, computing equipment 40 includes a central processing unit ("CPU") 100 such as a programmable microprocessor interfaced to computer bus 101. Also coupled to computer bus 101 are display interface 102 for interfacing to display 43, printer interface 104 for interfacing to printer 50 through a bi-directional communication line 106, floppy disk interface 124 for interfacing to floppy disk drive 44, keyboard interface 109 for interfacing to keyboard 46, and pointing device interface 110 for interfacing to pointing device 47. A random access memory ("RAM") 116 interfaces to computer bus 101 to provide CPU 100 with access to memory storage. In particular, when executing stored program instruction sequences, CPU 100 loads those instruction sequences from disk 45 (or other memory media such as computer readable media accessed via an unshown network interface) into RAM 116 and executes those stored program instruction sequences out of RAM 116. It should also be recognized that standard disk-swapping techniques available under windowing operating systems allow segments of memory to be swapped on and off disk 45 to RAM 116.

Read only memory ("ROM") 103 in computing equipment 40 stores invariant instruction sequences, such as start-up instruction sequences or basic input/output operating system ("BOIS") sequences for operation of keyboard 46.

Disk 45 is one example of a computer readable medium that stores program instruction sequences executable by CPU 100 so as to constitute operating system 111, application programs 112, printer driver 114 and other application programs, files, and device drivers such as driver 119. Application programs are programs by which computing equipment 40 generates files, manipulates and stores those files on disk 45, presents data on those files to a user via display screen 42, and prints data via printer 50. Disk 45 also stores an operating system 111 which, as noted above, is preferably a windowing operating system. Device drivers are also stored on disk 45. At least one of the device drivers comprises a printer driver 114 which provides a software interface to printer 50. Data exchanged between computing equipment 40 and printer 50 is effected by the printer driver, as described in more detail below. In particular, alignment according to the invention is controlled by program instruction sequences coded by printer driver 114.

Referring again to FIG. 5, printer 50 includes print controller 120 and print engine 131. Print controller 120 contains computerized and electronic devices used to control print engine 131, and print engine 131 includes physical devices such as carriage and line feed motors together with a print carriage and print heads depicted in FIG. 4 for obtaining print output. As shown in FIG. 5, print controller 120 includes CPU 121 such as an 8-bit or 16-bit microprocessor, ROM 122, control logic 124 and I/O ports 127 connected to bus 126. Also connected to control logic 124 is RAM 129. Connected to I/O ports 127 is EEPROM 132 for storing printer parameters, such as the width of conflict zones, which can be obtained by computing equipment 40 over bi-directional link 106 for use during subsequent printing operations.

Print engine 131 includes line feed motor 136 controlled by line feed motor driver 136*a*, and carriage motor 137 controlled by carriage motor driver 137*a*. Dual print heads 61*a* and 61*b* are removable print heads carried on carriage 63 (FIG. 4) and include ink ejection nozzles for forming a printed image on a recording medium, as well as sensors to provide feedback as to the presence and characteristics of the removable print heads. Also provided in print engine 131 are audible buzzer 128, cover sensors 134, user-actuatable switches 133 and indication LEDs 135.

Control logic 124 provides control signals for nozzles in print heads 61*a* and 61*b* and further provides control logic for line feed motor driver 136*a* and carriage motor driver 137*a*, via I/O port 127. I/O port 127 receives sensor output from print heads 61*a* and 61*b*, sensor output from sensors 134 and switches 133, and in addition provides control signals for buzzer 128 and LEDs 135. As noted above, I/O ports 127 channel control signals from control logic 124 to line feed motor driver 136*a* and carriage motor driver 137*a*.

ROM 122 stores font data, program instruction sequences to control printer 50, and other invariant data for printer operation. RAM 129 stores print data in a print buffer defined by the program instruction sequences in ROM 122, for printout by print heads 61*a* and 61*b*. EEPROM 132 provides non-volatile reprogrammable memory for printer information such as print head configuration, print head alignment parameters, parameters that identify the printer, the printer driver, the print heads, status of ink in the ink cartridges, width of conflict zones, and the like, all of which may be provided to print driver 114 in computing equipment 40 so as to inform computing equipment 40 of operational parameters of printer 50, and so as to allow print driver 114 to change print data sent to printer 50 over bi-directional communication line 106 so as to accommodate various configurations of printer 50.

Figure 6:
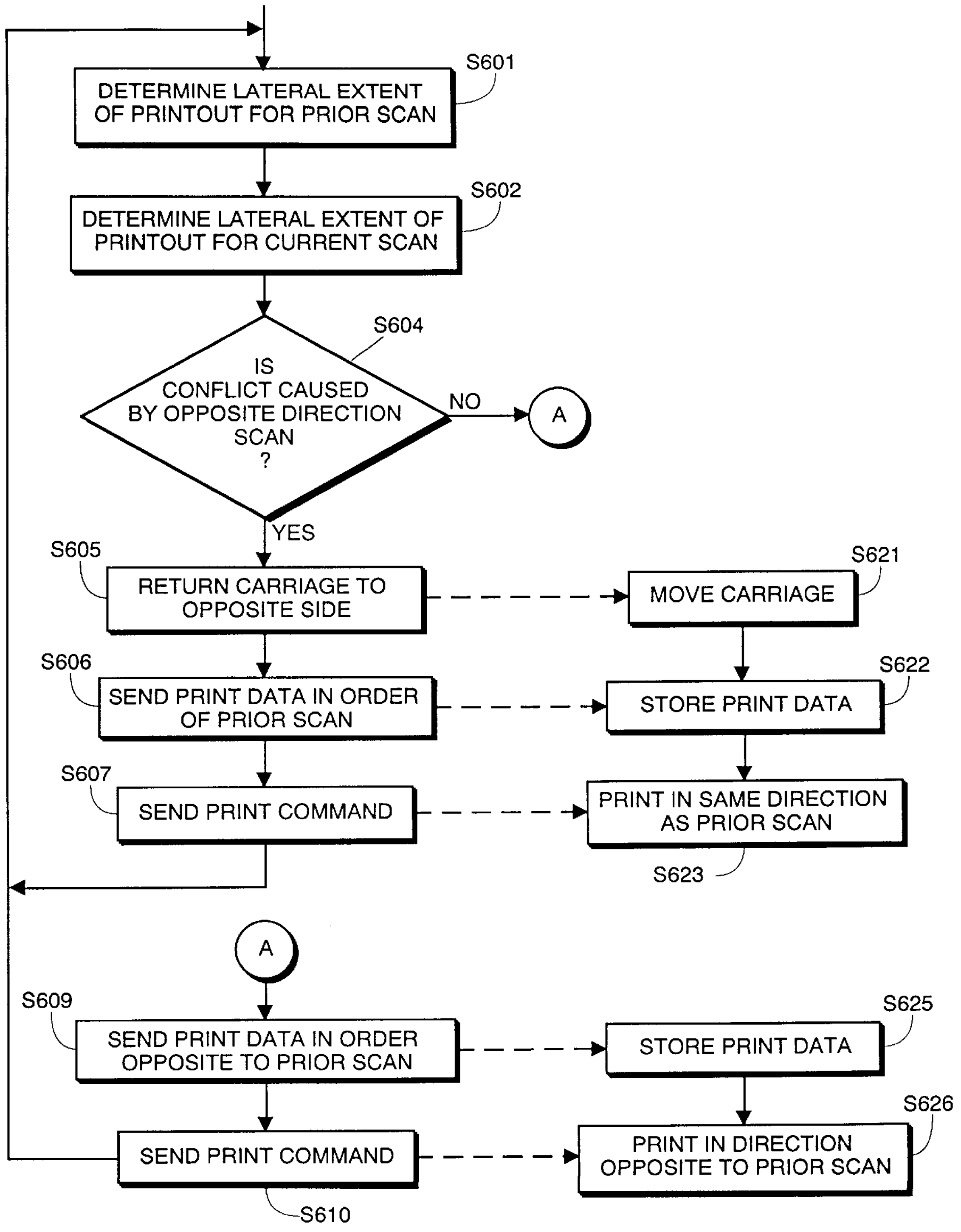
FIGS. 6 and 7 are views for explaining printing control according to a first embodiment of the invention.

FIG. 6 is a flow diagram illustrating computer-executable stored program instruction sequences constituting improved printing to accommodate carriage speed non-uniformities, according to one embodiment of the invention. The process steps shown in the left-hand side of FIG. 6 are preferably stored in printer driver 114 on disk 45, and are executed by CPU 100 so as to make determinations of whether reversed printing would degrade print quality based on carriage speed non-uniformities. On the other hand, the process steps in the right-hand side of FIG. 6 are preferably stored in ROM 122 for execution by CPU 121 so as to receive print data for forward or reversed printing, move carriage 63 based on commands from computing equipment 40, and print in directions commanded by computing equipment 40. In FIG. 6, solid lines refer to flow sequences within each of CPUs 100 and 121, whereas dashed lines refer to communication over bi-directional communication link 106.

Generally speaking, the stored program instruction sequences illustrated in FIG. 6 comprise printing for a current scan of print data based on printing direction and lateral extent of print data for a prior scan, in which a determination is made as to whether the lateral extent of print data for a current scan would cause print quality degradation due to carriage speed non-uniformities. If, based on the lateral extent of print data for the current and prior scan, a determination is made that print quality would be degraded by reverse printing, then print out of the current scan is effected in the same direction as that of the prior scan. On the other hand, if a determination is made that no or little degradation in print quality would occur if print out of the current scan were effected in a reversed direction, then print out of the current scan is effected in the reversed direction, thereby improving overall print efficiency.

In more detail, in step S601 computing equipment 40 determines the lateral extent of printed data on the recording medium for a prior scan, and in step S602 computing equipment 40 determines the lateral extent of printed data for a current scan. In step S604, a determination is made as to whether or not print out of the current scan, if made in a direction opposite to that of print out for the prior scan, would cause print quality degradation due to carriage speed non-uniformities. A full explanation of how conflicts might occur is given with respect to FIG. 7; generally speaking, however, conflicts would occur if printed data for both the current scan and the prior scan would appear at the same time in either one of conflict zones at extreme lateral edges of the recording medium.

If step S604 determines that a conflict would occur, meaning that print data would be degraded if print out of the current scan were printed in a direction opposite to that of the prior scan, then in step S605 computing equipment 40 commands printer 50 to return carriage 63 to the opposite side of the printer chassis, in preparation for print out in the same direction as that of the prior scan. After or during a movement of the carriage (step S621), computing equipment 40 sends print data to printer 50 for the current scan. As depicted in step S606, the print data for the current scan is sent to printer 50 in the same order as that of the prior scan. After the print data has been sent and stored in printer 50 (step S622), computing equipment 40 sends a command (step S607) to printer 50 so as to effect print out of the current scan in the same direction as that of the prior scan (step S623). Thereafter, flow returns to step S601, for processing of a next subsequent scan of print data.

On the other hands if step S604 determines that no conflict would be caused by reverse printing, meaning that print out of a current scan in a direction opposite to that of the prior scan would not unduly degrade print data due to carriage speed non-uniformities, then flow branches to step S609. In step S609, computing equipment 40 sends print data for the current scan to printer 50, the print data being sent in an order opposite to that of the prior scan. After storage of the print data by printer 50 (step S625), computing equipment sends a command to print the current scan (step S610). Printer 50 responds in step S626 by printing the current scan of print data in a direction opposite to that of the prior scan.

Flow when returns to step S601 for processing of a next subsequent scan.

Figure 1:
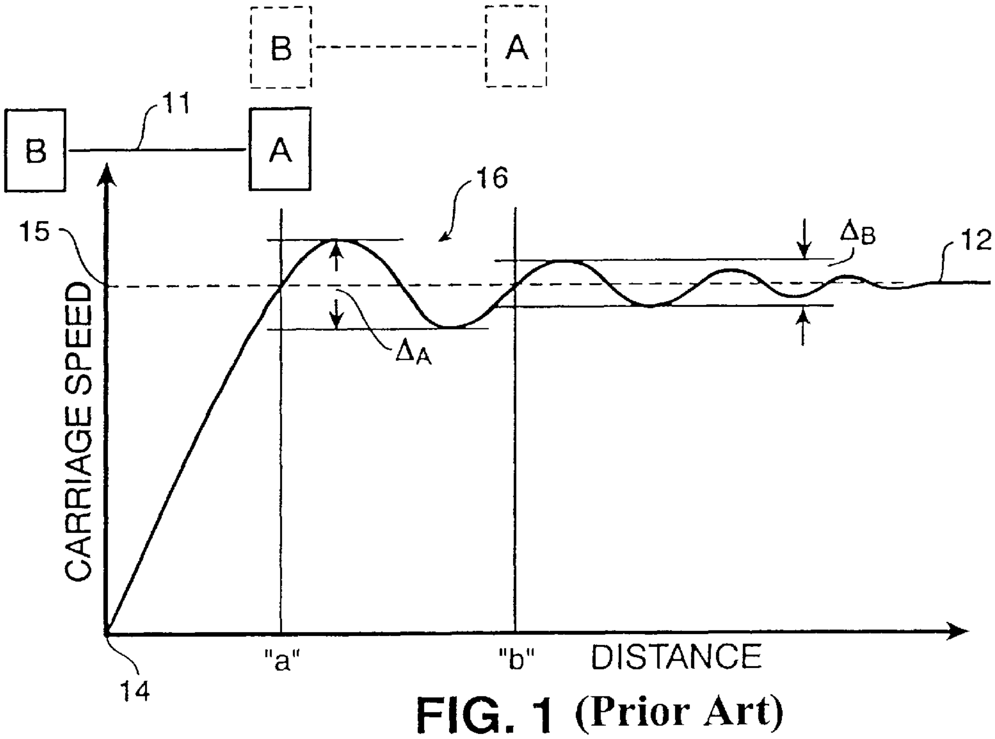
FIG. 1 (Prior Art)
FIGS. 1 and 2 are views for explaining ramp-up non-uniformities in carriage printing speed.
Figure 2:
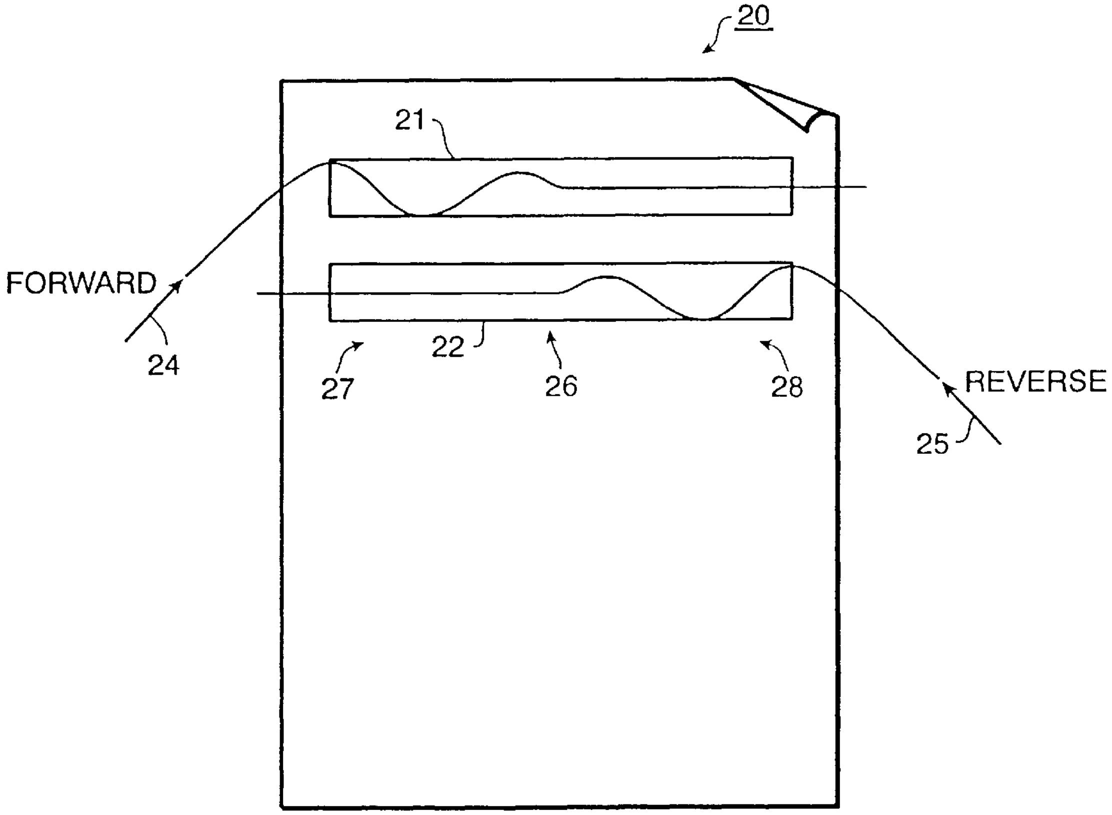
FIG. 2 (Prior Art)
Figure 7:
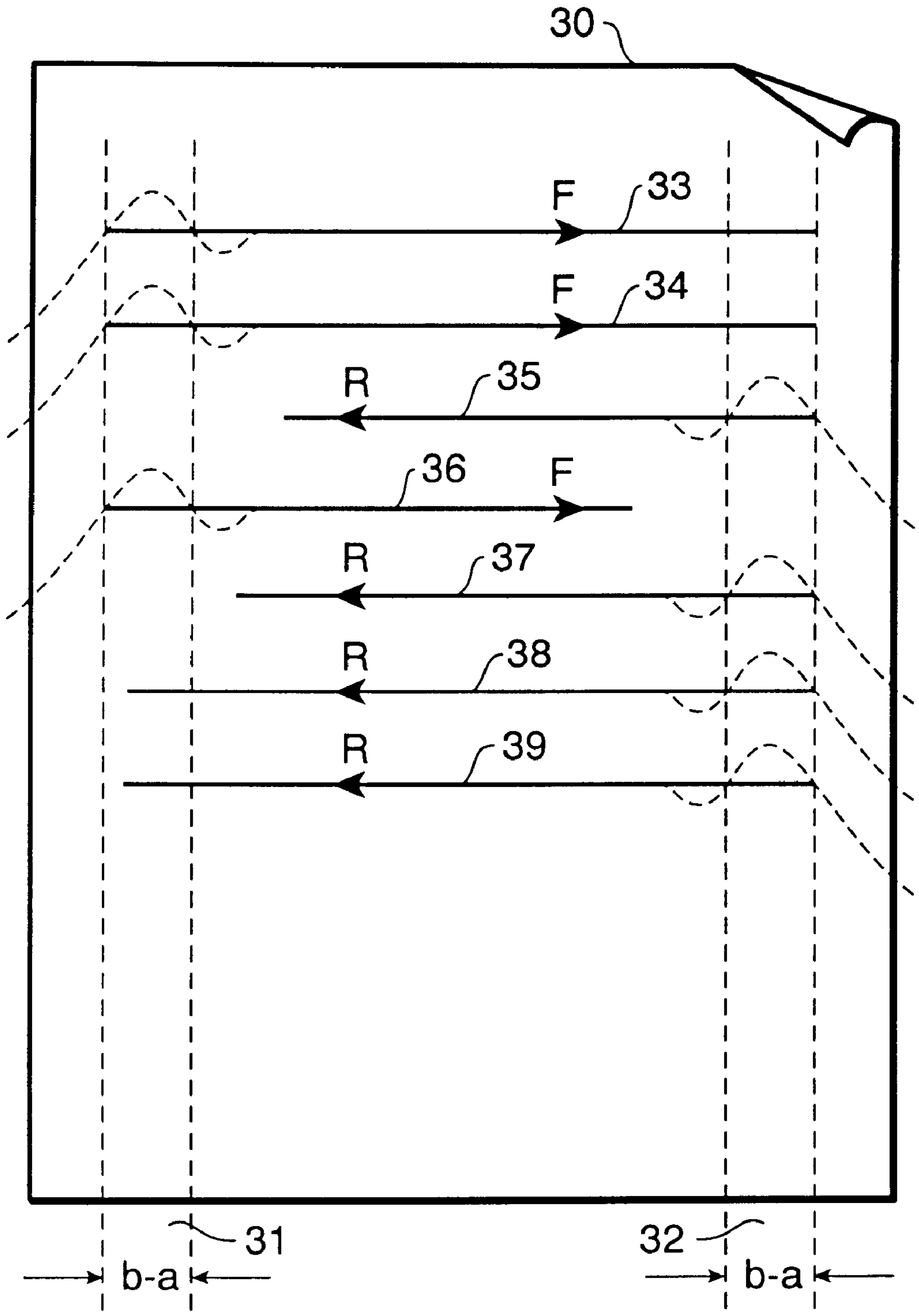

FIG. 7 is a view for explaining situations in which step S604 would determine that there would, or would not, be a conflict for reverse printing due to carriage speed non-uniformities. FIG. 7 depicts a recording medium 30 on which are shown plural scans 33 through 39 both in the forward direction and the reverse directions, respectively indicated by the letters "F" and "R". Shown in phantom lines and superimposed on each of scans 33 though 39 are ringing and overshoot patterns depicting carriage speed non-uniformities. Finally, FIG. 7 also shows conflict zones 31 and 32, each arranged at extreme lateral right and left-hand sides within the printing zone of recording medium 30. These conflict zones are sized from the edge of recording medium 30 (or from the edge of a print zone thereof), extending for a distance inwardly corresponding to the distance b−a (see FIG. 1) from where print degradations due to speed non-uniformities are noticeable to where they are no longer noticeable and do hot degrade print quality.

The flow diagram of FIG. 6 will now be explained with respect to each of scans 33 through 39 of FIG. 7.

Scan 33 proceeds in a forward direction, since it is the first scan on recording medium 30 and there is no need to make any determinations as to whether a conflict in scanning direction would occur.

For scan 34, step S604 determines that there would be a conflict if print out were effected in a reverse direction. The conflict would occur at both conflict zones 31 and 32, since if scanning were effected in a reverse direction then print out for scan 33 and for scan 34 would not match in both of the conflict zones. Accordingly, print out for scan 34 is effected in the same direction as that for scan 33, corresponding to steps S605 through S607.

With respect to scan 35, step S604 determines that no conflict would be caused. No conflict would be caused since the lateral extent of print data for scan 35 does not extend into either of conflict zones 31 or 32 where print data for prior scan 34 is present. Accordingly, print out for scan 35 is effected in a reverse direction, corresponding to steps S609 and S610.

With respect to scan 36, step S604 determines that no conflict would be caused. No conflict would be caused since there is no overlap of print data between current scan 36 and prior scan 35 in either of conflict zones 31 or 32. Accordingly, print out for scan 36 is effected in the opposite direction to that of prior scan 35, in correspondence to steps S609 and S610.

Likewise, for scan 37, no conflict would occur since there is no overlap of print data for current scan 37 or prior scan 36 in either of conflict zones 31 and 32. Accordingly, print out for scan 37 is effected in the direction opposite to that of prior scan 36.

On the other hand, for scan 38, since print data overlaps in at least one of the conflict zones (here conflict zone 32), step S604 determines that a conflict would occur if print out were effected in an opposite direction. Accordingly, print data for scan 38 is effected in the same direction as that of prior scan 37, corresponding to steps S605 through S607.

Likewise, for scan 39, since print data for the current scan and the prior scan overlap at least in one conflict zone (here conflict zone 31), print out of scan 39 is effected in the same direction as that of prior scan 38.

It is noted that the size of the conflict zones may be decreased by slowing the target scanning speed for carriage 63. Specifically, at slower speeds, the extent of overshoot and ringing is reduced significantly, resulting in smaller conflict zones. Accordingly, a second embodiment of the invention modifies that of the FIG. 6 embodiment by inserting a test to determine whether a slower carriage speed would avoid a conflict if opposite direction printing were allowed.

Specifically, this second embodiment is based on the observation that for slower carriage speeds, carriage speed non-uniformities are decreased dramatically, particularly non-uniformities due to ringing and speed overshoot. Thus, the width of critical zones, such as critical zones 31 and 32 depicted in FIG. 7, can be decreased. The end result is that, although individual ones of the scans on the recording medium may be made at a slower carriage speed, since more frequent forward and reverse printing would be permitted, overall printing efficiency is increased.

Figure 8:
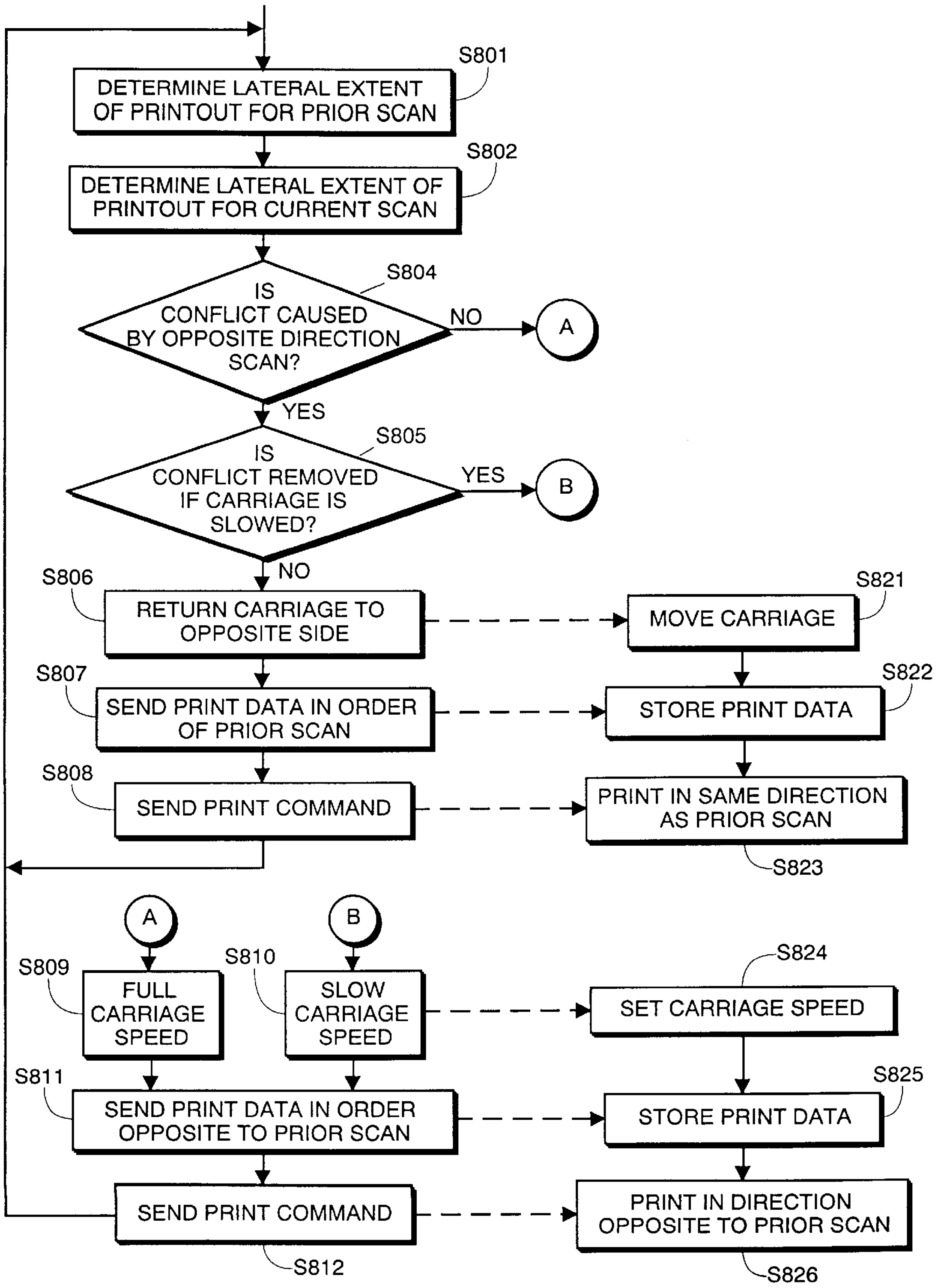
FIGS. 8 and 9 are views for explaining printing control according to a second embodiment of the invention.

Although the embodiment illustrated in FIG. 8 shows adjustment of printing speed in combination with decisions on forward and reverse printing, it should be noted that adjustments of printing speed alone can be made in connection with uni-directional printing.

In more detail, in step S801 computing equipment 40 determines the lateral extent of printed data on the recording medium for a prior scan, and in step S802 computing equipment 40 determines the lateral extent of printed data for a current scan. In step S804, a determination is made as to whether or not printout of the current scan, if printed at standard printing speed and if made in a direction opposite to that of printout for a prior scan, would cause print quality degradation due to carriage speed non-uniformities. Conflicts in step S804 are determined as shown above in connection with FIG. 7, and occur if printed data for both the current scan and the prior scan would appear at the same time in either one of conflict zones 31 and 32 at lateral edges of the recording medium.

If step S804 determines that no conflict would be caused by reverse printing at the standard printing speed, meaning that printout of a current scan in a direction opposite to that of the prior scan and at a high speed would not unduly degrade print data due to carriage speed non-uniformities, then flow branches to step S809 in which carriage speed for carriage 63 is set at full speed. Printer 50 responds by setting the carriage speed as appropriate (step S824). Thereafter, in step S811, computing equipment 40 sends print data for the current scan to printer 50, the print data being sent in an order opposite to that of the prior scan. After storage of the print data by printer 50 (step S825), computing equipment 40 sends a command to print the current scan (step S812). Printer 50 responds in step S826 by printing the current scan of print data at full carriage speed in a direction opposite to that of the prior scan. Flow then returns to step S801 for processing of the next subsequent scan.

Figure 9:
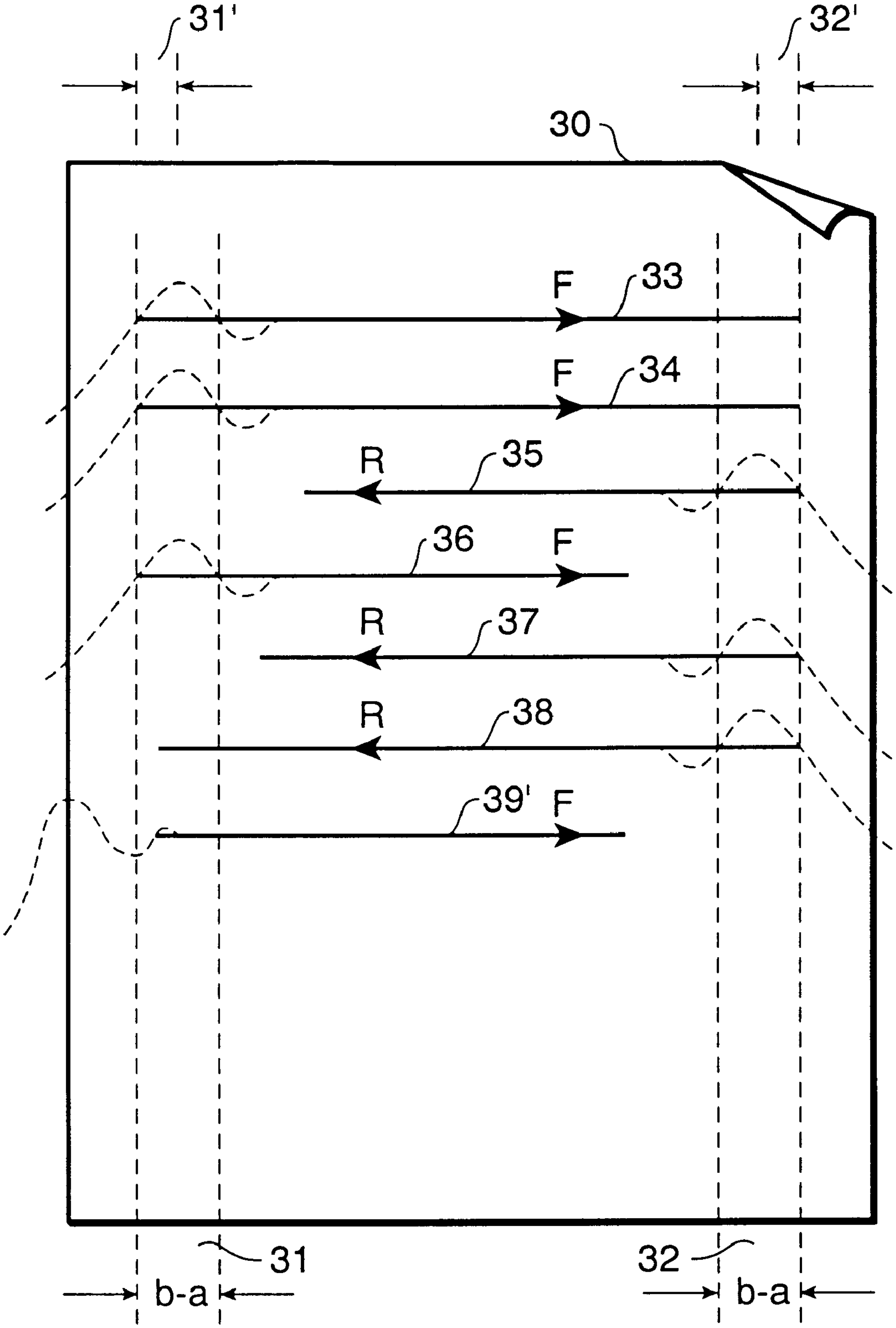

On the other hand, if step S804 determines that a conflict would be caused by reverse printing at full carriage speed, then flow proceeds to step S805 which determines whether the conflict would remain if the carriage speed were reduced. Specifically, at slower carriage speeds, meaning carriage speeds less than a full printing speed such as half printing speed, carriage non-uniformities due to ringing, overshoot and the like, are significantly decreased. In particular, as depicted in FIG. 9, the width of conflict zones 31 and 32 are reduced as shown at 31' and 32'. Thus, at slower carriage speeds, the width of the conflict zones 31' and 32' are reduced relative to the width of conflict zones 31 and 32 for full printing speeds. As a result, directing attention particularly to scan 39', although the first embodiment would have printed scan 39' in the reverse direction due to conflicts in conflict zone 31, since the width of conflict zone 31 is reduced to that shown at 31' at a slower carriage speed, no conflict would occur at a slower carriage speed. Accordingly, scan 39' can be printed at a slow carriage speed but in the forward direction rather than the reverse direction, thereby saving time needed to return the carriage to the opposite side and otherwise increasing overall printing efficiency.

Accordingly, returning to FIG. 8, if step S805 determines that the conflict would be removed if the carriage speed were slowed, flow branches to step S810 in which the carriage speed is set to a slow carriage speed, with printer 50 responding appropriately (step S824). Thereafter, flow proceeds to step S811 and S812, and to S825 and S826, for opposite direction printing.

On the other hand, if step S805 determines that the conflict would not be removed even if the carriage speed were slowed, then flow advances to steps S806 through S808 in which carriage 63 is returned to the opposite side of the printer chassis, print data is sent in the same order as that of the prior scan, and a print command is sent, all so as to cause printer 50 to print in the same direction as that of a prior scan (steps S821 through S823).

According to a third embodiment of the invention, the conflict zones might actually lie outside the lateral extent of the recording medium in a case where the recording medium is narrow and located centrally in the carriage reciprocation path. Thus, a third embodiment of the invention allows opposite direction printing in all instances where the recording medium is narrow and centrally located, since it is predetermined that step S604 would result in a "no-conflict" determination.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. Method for forward and reverse printing on a recording medium by reciprocal forward and reverse scans of a print head in accordance with print data, comprising the steps of:

determining a lateral printing extent of print data for a current scan;

comparing the lateral extent of print data for the current scan with a lateral extent of print data for a prior scan so as to determine whether print data for the current scan and the prior scan overlap in critical zones at lateral edges of the recording medium;

printing the current scan in a same direction as that of the prior scan in a case where print data overlaps in either one of the critical zones; and printing the current scan in a direction opposite to that of the prior scan in a case where print data does not overlap in either of the critical zones.

2. A method according to claim 1, wherein the critical zones are sized in correspondence with ramp up non-uniformities of a print carriage on which the print head is mounted, so as to accommodate a distance between a point where print degradations due to speed non-uniformities are noticeable to a point where print degradations due to speed non-uniformities are no longer noticeable.

3. A method according to claim 1, further comprising a step responsive to a determination that print data for a current scan and a prior scan overlap in at least one critical zone, the step comprising re-determination of whether print data for a current scan and a prior scan overlap if the current scan were printed at a slower print speed.

4. A method according to claim 1, further comprising the step of printing in forward and reverse reciprocal movement regardless of the determination in said determining step, in a case where a lateral extent of the recording medium is narrow and located centrally in the carriage reciprocation path.

5. A method for printing on a recording medium with a movable print head controllably movable in at least high and low scan speeds comprising the steps of:

determining a lateral printing extent of print data for a current scan;

comparing the lateral extent of print data for the current scan with a lateral extent of print data for a prior scan so as to determine whether print data for the current scan and the prior scan overlap in high-speed critical zones at lateral edges of the recording medium, wherein the high-speed critical zones correspond to critical zones for printing at the high scan speed;

printing the current scan at a high scan speed in a case where print data does not overlap in either of the high-speed critical zones;

responsive to a determination that print data overlaps in either one of the high-speed critical zones, comparing the lateral extent of print data for the current scan with the lateral extent of print data for the prior scan so as to determine whether print data for the current scan and the prior scan overlap in low-speed critical zones at lateral edges of the recording medium, the low-speed critical zones corresponding to the low scanning speed; and printing the current scan at the low scanning speed in a case where print data does not overlap in either of the low-speed critical zones.

6. A method according to claim 5, wherein the low-speed critical zones and the high-speed critical zones are sized in correspondence with ramp up non-uniformities at the high scanning speed and the low scanning speed, respectively, for a print carriage on which the print head is mounted, so as to accommodate a distance between a point where print degradations due to speed non-uniformities are noticeable to a point where print degradations due to speed non-uniformities are no longer noticeable.

7. A print control method comprising the steps of:

determining a lateral printing extent of print data for a current scan; and controlling a direction of printing based on the lateral printing extent and based on critical zones of a recording medium on which printing is effected, wherein said critical zones comprise an area of said recording medium where print carriage speed is non-constant and wherein printing is effected.

8. A print control method comprising the steps of:

a first determining step of determining a lateral printing extent of print data for a current scan;

a second deterring step if determining, based on the determined lateral printing extent, whether a size of a critical zone in which carriage speed non-uniformities occur and wherein printing is effected can be adjusted so as to reduce the size of the critical zone by controlling a target speed of printing; and controlling a target speed of printing based on a result of the second determining step.

9. A point control method according to claim 8, wherein the critical zone comprises an area from a point where the carriage reaches a predetermined speed to a point where a fluctuation of the carriage speed settles to a degree sufficient to effect recording.

10. An apparatus for forward and reverse printing on a recording medium by reciprocal forward and reverse scans of a print head in accordance with print data, comprising:

a memory for storing executable process steps; and a processor to execute said process steps stored in said memory;

wherein said process steps include steps to (a) determine a lateral printing extent of print data for a current scan, (b) compare the lateral extent of print data for the current scan with a lateral extent of print data for a prior scan so as to determine whether print data for the current scan and the prior scan overlap in critical zones at lateral edges of the recording medium, (c) print the current scan in a same direction as that of the prior scan in a case where print data overlaps in either one of the critical zones, and (d) print the current scan in a direction opposite to that of the prior scan in a case where print data does not overlap in either of the critical zones.

11. An apparatus according to claim 10, wherein the critical zones are sized in correspondence with ramp up non-uniformities of a print carriage on which the print head is mounted, so as to accommodate a distance between a point where print degradations due to speed non-uniformities are noticeable to a point where print degradations due to speed non-uniformities are no longer noticeable.

12. An apparatus according to claim 10, wherein said process steps further include a step responsive to a determination that print data for a current scan and a prior scan overlap in at least one critical zone, to re-determine whether print data for a current scan and a prior scan overlap if the current scan were printed at a slower print speed.

13. An apparatus according to claim 10, wherein said process steps further include a step to print in forward and reverse reciprocal movement regardless of the determination in said determining step, in a case where a lateral extent of the recording medium is narrow and located centrally in the carriage reciprocation path.

14. An apparatus for printing on a recording medium with a movable print head controllably movable in at least high and low scan speeds comprising:

a memory for storing executable process steps; and a processor to execute said process steps stored in said memory;

wherein said process steps include steps to (a) determine a lateral printing extent of print data for a current scan, (b) compare the lateral extent of print data for the current scan with a lateral extent of print data for a prior scan so as to determine whether print data for the current scan and the prior scan overlap in high-speed critical zones at lateral edges of the recording medium, wherein the high-speed critical zones correspond to critical zones for printing at the high scan speed, (c) print the current scan at a high scan speed in a case where print data does not overlap in either of the high-speed critical zones, (d) responsive to a determination that print data overlaps in either one of the high-speed critical zones, comparing the lateral extent of print data for the current scan with the lateral extent of print data for the prior scan so as to determine whether print data for the current scan and the prior scan overlap in low-speed critical zones at lateral edges of the recording medium, the low-speed critical zones corresponding to the low scanning speed, and (e) print the current scan at the low scanning speed in a case where print data does not overlap in either of the low-speed critical zones.

15. An apparatus according to claim 14, wherein the low-speed critical zones and the high-speed critical zones are sized in correspondence with ramp up non-uniformities at the high scanning speed and the low scanning speed, respectively, for a print carriage on which the print head is mounted, so as to accommodate a distance between a point where print degradations due to speed non-uniformities are noticeable to a point where print degradations due to speed non-uniformities are no longer noticeable.

16. A print control apparatus comprising:

a memory for storing executable process steps; and a processor to execute said process steps stored in said memory;

wherein said process steps include steps to (a) determine a lateral printing extent of print data for a current scan, and (b) control a direction of printing based on the lateral printing extent and based critical zones of a recording medium on which printing is effected, wherein said critical zones comprise an area of said recording medium where print carriage speed is non-constant and wherein printing is effected.

17. A print control apparatus comprising:

a memory for storing executable process steps; and a processor to execute said process steps stored in said memory;

wherein said process steps include (a) a first determining step of determining a lateral printing extent of print data for a current scan, (b) a second determining step of determining, based on the determined lateral printing extent, whether a size of a critical zone in which carriage speed non-uniformities occur and wherein printing is effected can be adjusted so as to reduce the size of the critical zone by controlling a target speed of printing, and (c) controlling a target speed of printing based on a result of the second determining step.

18. A print control apparatus according to claim 17, wherein the critical zone comprises an area from a point where the carriage reaches a predetermined speed to a point where a fluctuation of the carriage speed settles to a degree sufficient to effect recording.

19. Computer-executable process steps stored on a computer readable medium, said process steps for forward and reverse printing on a recording medium by reciprocal forward and reverse scans of a print head in accordance with print data, said process steps comprising:

a determining step to determine a lateral printing extent of print data for a current scan;

a comparing step to compare the lateral extent of print data for the current scan with a lateral extent of print data for a prior scan so as to determine whether print data for the current scan and the prior scan overlap in critical zones at lateral edges of the recording medium a first printing step to print the current scan in a same direction as that of the prior scan in a case where print data overlaps in either one of the critical zones; and a second printing step to print the current scan in a direction opposite to that of the prior scan in a case where print data does not overlap in either of the critical zones.

20. Computer-executable process steps according to claim 19, wherein the critical zones are sized in correspondence with ramp up non-uniformities of a print carriage on which the print head is mounted, so as to accommodate a distance between a point where print degradations due to speed non-uniformities are noticeable to a point where print degradations due to speed non-uniformities are no longer noticeable.

21. Computer-executable process steps according to claim 19, wherein said process steps further include a re-determining step responsive to a determination that print data for a current scan and a prior scan overlap in at least one critical zone, to re-determine whether print data for a current scan and a prior scan overlap if the current scan were printed at a slower print speed.

22. Computer-executable process steps according to claim 19, wherein said process steps further include a third printing step to print in forward and reverse reciprocal movement regardless of the determination in said determining step, in a case where a lateral extent of the recording medium is narrow and located centrally in the carriage reciprocation path.

23. Computer-executable process steps stored on a computer readable medium, said process steps for printing on a recording medium with a movable print head controllably movable in at least high and low scan speeds, said process steps comprising:

a determining step to determine a lateral printing extent of print data for a current scan;

a comparing step to compare the lateral extent of print data for the current scan with a lateral extent of print data for a prior scan so as to determine whether print data for the current scan and the prior scan overlap in high-speed critical zones at lateral edges of the recording medium, wherein the high-speed critical zones correspond to critical zones for printing at the high scan speed;

a printing step to print the current scan at a high scan speed in a case where print data does not overlap in either of the high-speed critical zones;

a comparing step responsive to a determination that print data overlaps in either one of the high-speed critical zones, to compare the lateral extent of print data for the current scan with the lateral extent of print data for the prior scan so as to determine whether print data for the current scan and the prior scan overlap in low-speed critical zones at lateral edges of the recording medium, the low-speed critical zones corresponding to the low scanning speed; and a printing step to print the current scan at the low scanning speed in a case where print data does not overlap in either of the low-speed critical zones.

24. Computer-executable process steps according to claim 23, wherein the low-speed critical zones and the high-speed critical zones are sized in correspondence with ramp up non-uniformities at the high scanning speed and the low scanning speed, respectively, for a print carriage on which the print head is mounted, so as to accommodate a distance between a point where print degradations due to speed non-uniformities are noticeable to a point where print degradations due to speed non-uniformities are no longer noticeable.

25. Computer executable process steps stored on a computer readable medium, said process steps for forward and reverse printing on a recording medium by reciprocal forward and reverse scans of a print head in accordance with print data, said process steps comprising:

a determining step to determine a lateral printing, extent of print data for a current scan; and a controlling step to control a direction of printing based on the lateral printing extent and based on critical zones of a recording medium on which printing is effected, wherein said critical zones comprise an area of said recording medium where print carriage speed is non-constant and wherein printing is effected.

26. Computer-executable process steps stored on a computer readable medium, said process steps for forward and reverse printing on a recording medium by reciprocal forward and reverse scans of a print head in accordance with print data, said process steps comprising:

a first determining step of determining a lateral printing extent of print data for a current scan;

a second determining step of determining, based on the determined lateral printing extent, whether a size of a critical zone in which carriage speed non-uniformities occur and wherein printing is effected can be adjusted so as to reduce the size of the critical zone by controlling a target speed of printing; and a controlling step of controlling a target speed of printing based on a result of the second determining step.

27. Computer-executable process steps according to claim 26, wherein the critical zone comprises an area from a point where the carriage reaches a predetermined speed to a point where a fluctuation of the carriage speed settles to a degree sufficient to effect recording.

* * * * *

UNITED STATES PATENT AND TRADEMARK OFFICE

CERTIFICATE OF CORRECTION

PATENT NO. : 6,373,593 B1
DATED : April 16, 2002
INVENTOR(S) : Yamada et al.

It is certified that error appears in the above-identified patent and that said Letters Patent is hereby corrected as shown below:

Column 7,
Line 20, "hot" should read -- not --

Column 10,
Line 60, "deterring" should read -- determining --.

Column 11,
Line 1, "point" should read -- print --.

Column 12,
Line 59, "medium" should read -- medium; --.

Column 14,
Line 19, "printing," should read -- printing --.

Signed and Sealed this

Eighteenth Day of June, 2002

*Attest:*

JAMES E. ROGAN

*Attesting Officer*

*Director of the United States Patent and Trademark Office*